(12) United States Patent
Corey et al.

(10) Patent No.: US 9,010,211 B2
(45) Date of Patent: Apr. 21, 2015

(54) SHIFTER APPARATUS WITH ADJUSTABLE SHIFT STICK LENGTH AND TENSION SELECTION FEATURES

(76) Inventors: Colin J. Corey, Redwood City, CA (US); William W. Washburn, Walnut Creek, CA (US); Craig J. Corey, Hillsborough, CA (US)

( * ) Notice: Subject to any disclaimer, the term of this patent is extended or adjusted under 35 U.S.C. 154(b) by 211 days.

(21) Appl. No.: 13/584,766

(22) Filed: Aug. 13, 2012

(65) Prior Publication Data

US 2013/0036850 A1 Feb. 14, 2013

Related U.S. Application Data

(60) Provisional application No. 61/522,786, filed on Aug. 12, 2011.

(51) Int. Cl.
| B60K 20/00 | (2006.01) |
| G05G 9/00 | (2006.01) |
| B60K 20/02 | (2006.01) |
| B60K 20/04 | (2006.01) |

(52) U.S. Cl.
CPC .......... *B60K 20/02* (2013.01); *Y10T 74/20171* (2015.01); *Y10T 74/20159* (2015.01); *B60K 20/04* (2013.01)

(58) Field of Classification Search
CPC ..... F16H 59/10; F16H 59/0278; F16H 59/02; F16H 61/24; F16H 59/08; F16H 2059/0273; F16H 59/00

USPC .......... 74/473.1, 473.3, 473.33, 473.35, 469, 74/471 XY

See application file for complete search history.

(56) References Cited

U.S. PATENT DOCUMENTS

| 2,205,589 | A | * | 6/1940 | Bixby | ........................ 74/473.33 |
| 2,252,158 | A | * | 8/1941 | Bixby | ........................ 74/473.1 |
| 2,255,643 | A | * | 9/1941 | Beimer | ........................ 74/473.35 |
| 2,456,182 | A | * | 12/1948 | Goble | ........................ 285/153.3 |
| 3,800,615 | A | * | 4/1974 | Pilch | ........................ 74/471 XY |
| 4,515,032 | A | | 5/1985 | Olmsted | |
| 5,626,054 | A | * | 5/1997 | Rembert et al. | ................. 74/104 |
| 6,029,535 | A | | 2/2000 | Kenny et al. | |
| 6,494,111 | B1 | * | 12/2002 | Lee | ........................ 74/473.27 |
| 7,000,497 | B1 | | 2/2006 | Campbell et al. | |
| 7,464,621 | B2 | | 12/2008 | Mathis et al. | |
| 2008/0173120 | A1 | * | 7/2008 | Ciamillo | ........................ 74/473.3 |

\* cited by examiner

*Primary Examiner* — Justin Krause
(74) *Attorney, Agent, or Firm* — Claude A.S. Hamrick; IPXLAW Group LLP

(57) ABSTRACT

A remote shifter apparatus for use in a manual transmission equipped vehicle includes a base, a length adjustable shift stick, a transmission shift lever engaging fastener and a linkage directly coupling the stick to the fastener to translate shift stick movement to the transmission lever. The shift stick is free to rotate laterally and longitudinally relative to the vehicle drive axis and about a ball joint to cause the transmission lever to be moved through its full range of motion for each gear. A mechanism is provided for enabling adjustment of the length of the shift stick to accommodate selective variations in throw length. The ball joint frictional relationship between shift stick and base is also selectively adjustable to provide a customizable shift feel to improve feedback to the driver.

16 Claims, 4 Drawing Sheets

SHIFTER APPARATUS WITH ADJUSTABLE SHIFT STICK LENGTH AND TENSION SELECTION FEATURES

CROSS-REFERENCE TO RELATED APPLICATIONS

This application is a Non-Provisional U.S. application and claims Priority to corresponding U.S. Provisional Application Ser. No. 61/522,786 filed on Aug. 12, 2012, and entitled "IMPROVED DROP-IN TYPE SHIFTER WITH DISPLACED ADJUSTABLE SHIFT STICK", the pending application of which is hereby incorporated herein by reference in its entirety.

TECHNICAL FIELD

The present invention relates generally to transmission shifting apparatus for vehicles with manual transmission shifters, and more specifically to an adjustable remote shifter apparatus for translating shift stick position in a vehicle having a manual transmission. The shifter apparatus may also be used with some types of manually actuable automatic transmissions.

BACKGROUND ART

An important aspect of the functionality and convenience of use of automobiles over the years has related to the manner and facility whereby manual transmission gear settings can be selected by the vehicle driver. In high performance automobiles, and particularly those suited for racing, the precision and speed by which gears can be selected is of great import as to performance. In many manual transmission equipped vehicles the shift stick is positioned at a location that is less than ideal for at least some individual drivers. For example, in classic race cars (such as the Alfa Romeo) the transmission shift lever is located directly on top of the transmission under the floor board, and in a position often requiring a mechanical linkage such as a long, curved shift stick or lever, or the like, to locate a shift stick and knob within the driver's reach. Using such ungainly lever apparatus, shifting is often imprecise and the hand travel in moving the shifting lever between gear positions may be as much as several inches, sometimes requiring the driver to twist or lean forward in the seat and reach out to select first, third and fifth gears. This is of course undesirable in that it is neither convenient nor comfortable to use and has the likelihood of negatively affecting driver performance and operation of the vehicle. It is thus desirable in many cases that means be provided for improving the location and operation of the shift stick mechanism. For example, in some classic cars this can be accomplished by remotely positioning the shift stick and knob so as to locate it spatially closer to the driver and therefore easier to reach and operate with minimal hand movement. Closer placement of the shift stick also results in reduction of the time that the driver's hand must be out of engagement with the steering wheel and is thus a safety enhancement.

There are a number of types of manual transmission shifting devices that have been utilized over the years. Such devices include, for example, transmission mounted shifters, column mounted shifters, drop-in type shifters, and remote, floor pan mounted type shifters. Transmission mounted shifters are usually bolted to the side of the transmission and include tabs or retaining brackets to connect an elongated shift lever to the transmission actuating elements. Column mounted shifters are similar except that they include a more complex linkage connecting a shift stick or lever to the transmission.

Drop-in type shifters are mounted to the top of the transmission and typically include a base, a shift stick pivotally mounted on the base, and a gear actuating lever extending downwardly from the base and joined to the shift stick. The base is secured at an aperture on the top of the transmission with the gear actuating lever extends downwardly from the base through the aperture and into the transmission. In drop-in type shifters, the shift stick normally extends vertically through the floor pan generally from the centerline of the transmission Remote shifters are yet another type of manual transmission shifter, and translate the shift point away from the transmission and back towards the driver. The shift motion is transmitted through a linkage, thereby allowing the driver to directly manipulate the transmission.

TECHNICAL PROBLEM

In current remote shifters, the throw length is set to either a short shifter length or a stock shifter length, based on the geometry of the remote shifter apparatus.

Fore, aft and lateral movement of the gear actuating lever causes changes in the drive ratio of the transmission when the shift stick is pivoted.

Furthermore, the mechanical characteristics of the apparatus are fixed and the operational function may have a looseness or stiffness not appropriate for all drivers.

Although some presently available apparatus improves shift stick positioning, its feel and functionality are not universally optimized for all, due primarily to variations in driver strength and anatomical characteristics.

In high performance and racing vehicles it is known that shift stick position and shift stick length have an influence on driver comfort, vehicle control and shift time, and therefore directly affect driver endurance, lap times and safety.

It is also known that the ability of a race car driver to accurately, quickly and efficiently shift from one gear setting to another with optimal control feedback has a substantial influence on driver performance.

SOLUTION TO THE PROBLEM

It is thus desirable that the tension, or stiffness, of the link between shift stick and transmission be selectively adjustable to suit the "feel" and control feedback requirements of the driver.

There is also a need for an improved remote shifter apparatus that is selectively adjustable in various respects and can be easily retrofit to an automobile.

There is also a need for an improved means for optimizing the positioning and throw length of the shift stick in such vehicles.

SUMMARY OF THE INVENTION

Briefly, a remote shifter apparatus in accordance with the present invention includes a retrofitable mechanism having variable tension and throw length capabilities. The apparatus is comprised of a base, a pivotable shift stick coupled to the base, a transmission lever engaging fastener, and a linkage bar connecting the shift stick to the transmission lever engaging fastener. The shift stick includes an upper component and a knurled lower component. One end of the upper component is threaded to mate with a ball shaped or otherwise configured shift knob, and the opposite end is threaded to mate with the correspondingly threaded upper end of the lower component. The lower end of the lower component is configured to have a generally spherical shape and is mated with a socket formed in the base. A knurled, ball capturing collar threadably engages the base to compressively engage the ball end and form a ball-joint pivot structure about which the shift stick can be rotated. The length of the shift stick can be selectively adjusted by rotating the knurled lower component, and the tension, or stiffness, of the stick in rotating about its pivot point can be selectively adjusted by loosening or tightening the knurled ball capture collar.

Advantageous Effects of the Invention

An advantage of the present invention is that it allows a wide range of adjustment between stock throw length and rally throw length so that the driver can set up the shift control aspects of the vehicle to his/her personal taste. The ability to adjust the throw length is desirable for racing, as a customizable shift stick length can decrease shift time and therefore decrease lap times.

Another advantage of the present invention is that it allows adjustment of the tension on the shift lever itself; a feature not available on competing devices, and thus changes the force required to effect a shift from one gear select position to another. This feature makes the shifting action smoother and more customizable to the driver; yet another factor in racing that has a positive effect on lap time performance.

Still another advantage of the present invention is that the shift lever is separated into two pieces, a lower shift stick component including a ball-joint forming element and an upper shift stick component. By rotating the lower component, the upper component is driven by corresponding threads either up or down relative to the base upon which it is mounted Yet another advantage of the present invention is that it allows variable tensioning of the shift stick pivot mechanism. This is accomplished by separating the traditional base into two pieces; one, a ball capture collar, threaded into the other. By tightening the pieces together, the compression on the ball element is increased and the shifter requires more force to actuate, and conversely, if the ball capture force between base and corresponding collar is loosened, the shifter requires less force to actuate.

In racing applications drivers achieve better results by customizing the cars setup to their individual needs. The shifter apparatus of the present invention allows drivers to not only adjust the throw length to their desired setting, but also to adjust the tension on the shifter, generating more useable feedback for the driver. These two features allow drivers to shift faster, shift easier, and overall allow drivers to race better.

In addition to shift knob placement, the present invention allows the driver to both select a shorter throw length for more precise and rapid shifts, and to vary the tension in the shift system to improve feedback to the driver. These features are beneficial to drivers and racers who want to adjust the shifter for a custom fit to their driving style.

These and other objects and advantages of the present invention will become apparent from a reading of the following description of a presently preferred embodiment thereof which makes reference to the several figures of the drawing.

IN THE DRAWING

DETAILED DESCRIPTION OF A PREFERRED EMBODIMENT

Figure 1:
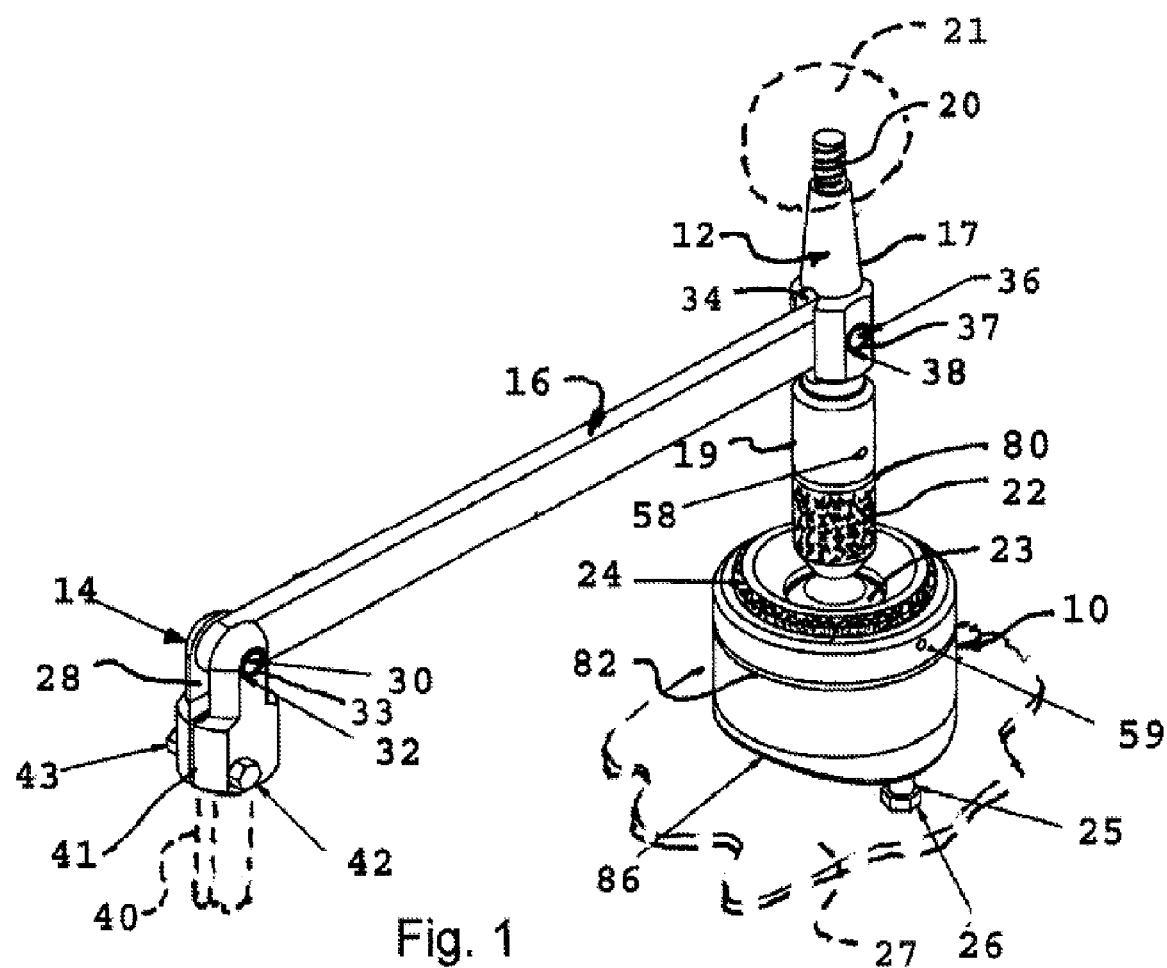
FIG. 1 is a perspective view showing a presently preferred embodiment of a shifter apparatus in accordance with the invention.

Referring now to FIG. 1 of the drawing, an embodiment of the present invention is depicted which includes a base 10, a pivotable shift stick 12 coupled to the base 10, a transmission shift lever engaging fastener 14, and a linkage bar 16 connecting the shift stick 12 to the fastener 14. The shift stick 12 is a two piece assembly which includes an upper component 17 and a lower component 19. The upper end 20 of component 17 is threaded to mate with a ball shaped or otherwise configured shift knob 21 (as suggested by the dashed line), and the opposite end (not shown in this figure) is threaded to mate with the correspondingly threaded (not shown) lower component 19.

The lower component 19 is a single part but includes two functional portions; namely, an adjustment facilitating portion and a pivot forming portion. This is to say that at least a portion of the outer surface of the upper part of component 19 is configured to have a knurled or other finger gripable or tool engagable outer surface as depicted at 22. The lower end portion 23 of component 19 is configured to mate with a socket (not shown) formed in the base 10 to serve as a pivot about which the shift stick 12 can be manipulated.

As further described below, a capture ring or collar 24 is disposed to threadably engage the base 10 to capture the end portion 23 and form the above mentioned pivot. Collar 24 preferably has a knurled or tool engagable outer surface for facilitating its rotation relative to base 10. As will also be further explained below, shift stick 12 can be selectively adjusted by rotating the lower component 19 relative to the upper component 17 to lengthen or shorten the overall length of the stick. In addition, the tension, or stiffness, of the stick 12 in rotating about its pivot can be selectively adjusted by loosening or tightening the collar 24. The bottom of base 10 includes an appropriate number of downwardly extending bolts, studs or other means 25 and nuts 26 for mounting it to the vehicle floor board, chasis or transmission housing 27.

The linkage rod or bar 16 is a rigid length of metal, plastic or other suitable material having transversely extending bores (FIG. 2) formed therein proximate each end. The bores may have hardened steel bearings disposed therein to receive and interact with the hardened steel pivot pins. Bar 16 may have any suitable transverse cross section and can be of any suitable length.

Fastener 14 has a slot 28 formed in its upper portion for receiving one end of bar 16 and is pivotally secured thereto by a pin 30 that is passed through bearing sleeves 33 disposed in bores 32 formed on each side of slot 28 and a corresponding bearing sleeved bore in the bar 16. The other end of bar 16 extends into or through a slot 34 formed in stick 12 and is pivotally secured thereto by a second pin 36 that is passed through bearing sleeves 37 disposed in bores 38 formed on each side of slot 34 and in the other bore in the bar 16. The longitudinal axes of pins 30 and 36 are preferably directed parallel to each other to facilitate accurate transfer of stick motion to transmission lever motion.

As will further be described below, the fastener 14 has a socket, slot or bore (not shown) formed in its lower portion for receiving and clampingly engaging the distal end of a transmission actuating lever 40 extending from the transmission upwardly through an opening (not shown) in the floor board or transmission 27 of the vehicle. A narrow relief cut or slot 41 extends into one of the walls forming the pocket or socket 44 and one or more bolts 42 and nuts 43 secure the fastener to the lever 40.

Figure 2:
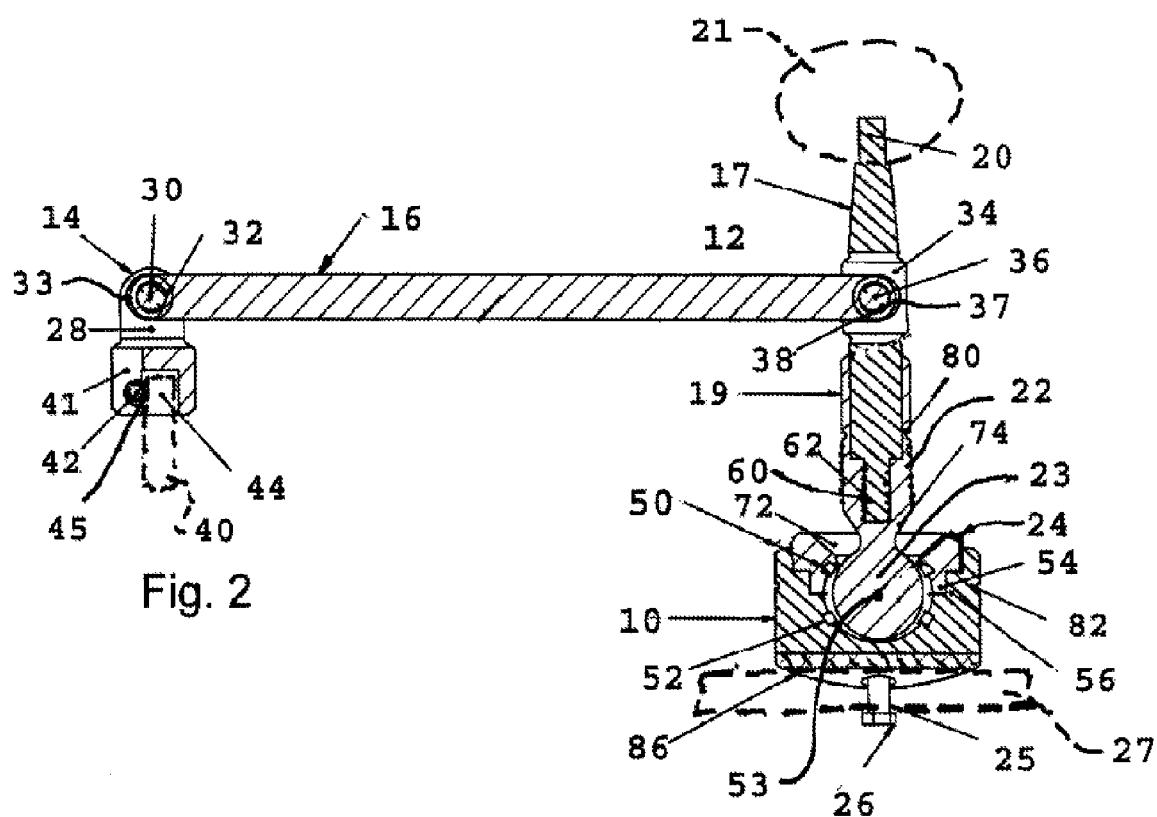
FIG. 2 is a longitudinal cross section taken along the centerline of the embodiment depicted in FIG. 1.
Figure 4:
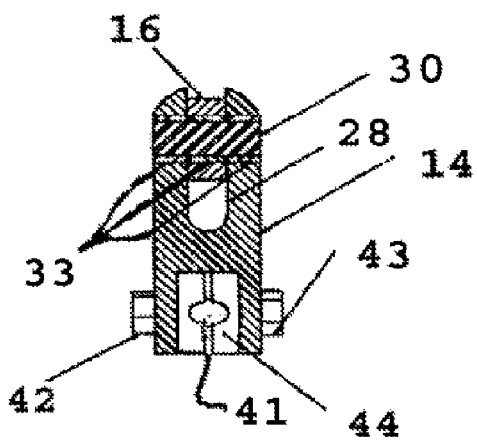
FIG. 4 is a transverse cross section taken through transmission shift lever fastening component.
Figure 5:
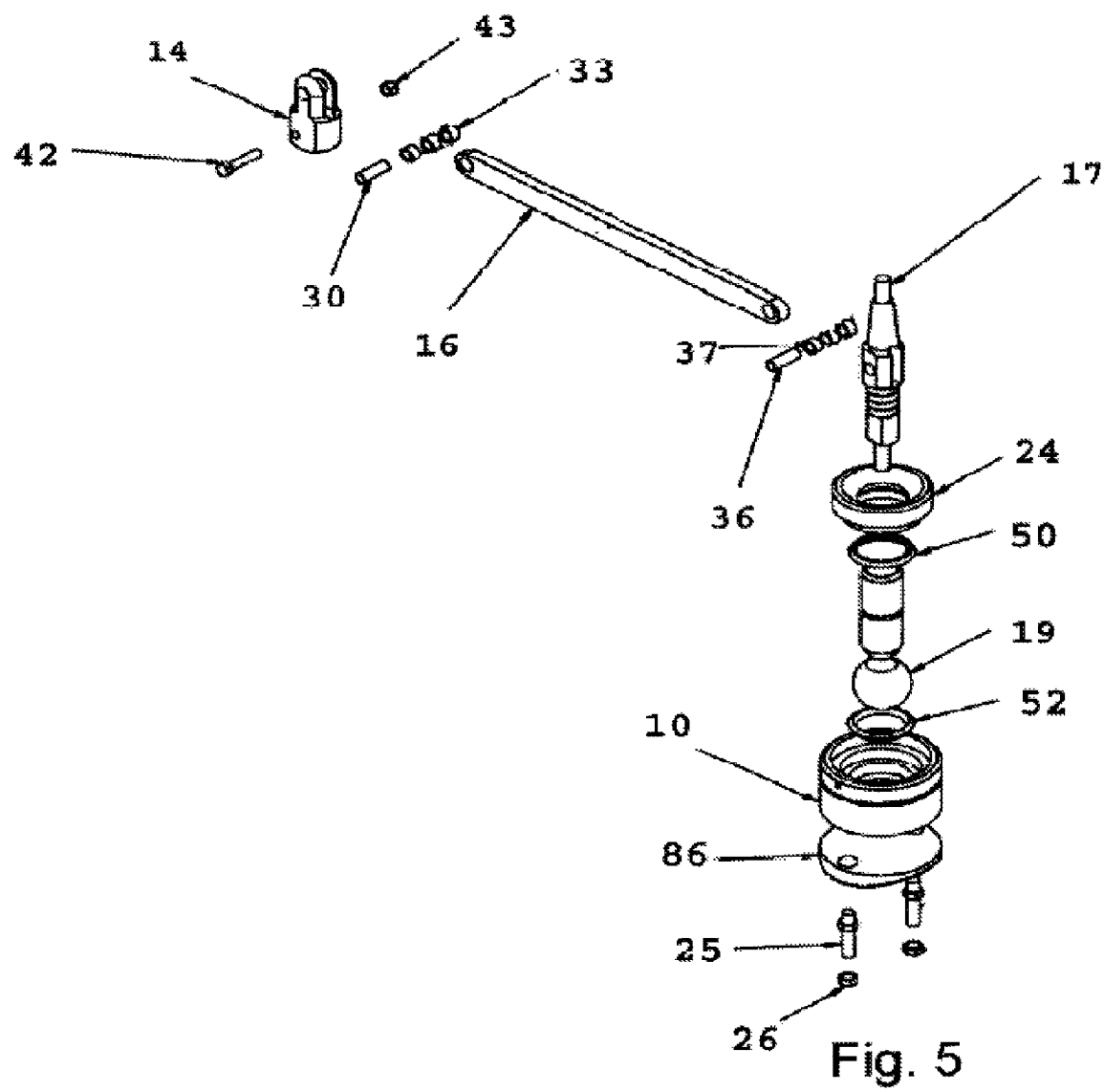
FIG. 5 is an exploded view showing the respective component parts of the embodiment illustrated in FIG. 1.

Turning now to FIG. 2, a cross section is presented which is taken along the longitudinal centerline of the bar 16 and other components of the embodiment depicted in FIG. 1. As described above, the fastener 14 (also depicted in more detail in FIGS. 4 and 5) is adapted to be securely attached to the distal end of a transmission actuating lever 40 by inserting the end of the lever into an end receiving, slotted pocket or socket 44 wherein it is retained by the bolt 42 disposed to pass through a transversely extending bore 45 and threadably mate with the nut 43. By tightening the nut on the retaining bolt to an appropriate torque, the bolt 43 not only provides an interference fit with the transmission lever but it also collapses the gap 41 to thus compressively engage and grip the transmission lever. This dual fixation allows for a tighter, more secure fit between the fastener 14 and the end portion of lever 40.

As additionally shown in FIG. 2, hardened steel sleeve bearings 33 and 37 form the transverse apertures for receiving and interacting with the pins 30 and 36 respectively. The shift stick 12 translates, or transfers, its motion via linkage bar 16 and fastener 14 directly to the transmission lever 40. The bar 16 can transmit lateral force from the shift stick 12 to the transmission lever 40 by two modes: interacting with the side walls of the stick slot 34 and fastener slot 28, and/or interacting with the hardened tool steel bearing pins 30 and 36. In the first mode of action, the lateral faces of the bar 16 applies pressure via fastener 14 to the lateral faces of the transmission lever 40 thereby effecting lever motion in the lateral direction (relative to the longitudinal axis of the transmission). In the second mode of action, the hardened steel pins 30 and 36 apply longitudinal pressure (along the length of bar 16) to the hardened steel bearing sleeves 30 and 37 thereby translating longitudinal motion to the shift stick 12 to the bar 16, and from the fastener 14 to the transmission lever 40. Utilizing both types of motion/force transfer, the relative motion between the shift stick 12 and the fastener 14 is kept to a minimum.

The user is able to attach an aftermarket shift knob 21 to the shift stick 12 utilizing the threads forms on the stick end portion 20. The standard thread size of ⅜-16 is used in this application to fit the widest variety of aftermarket shift knobs. Driver forces applied to the shift knob 21 generate motion about the ball joint center of rotation. All of the shift knob motion is then translated from the shift stick 12 to the transmission linkage bar 16 and fastener 14 to the transmission lever 40.

Figure 3:
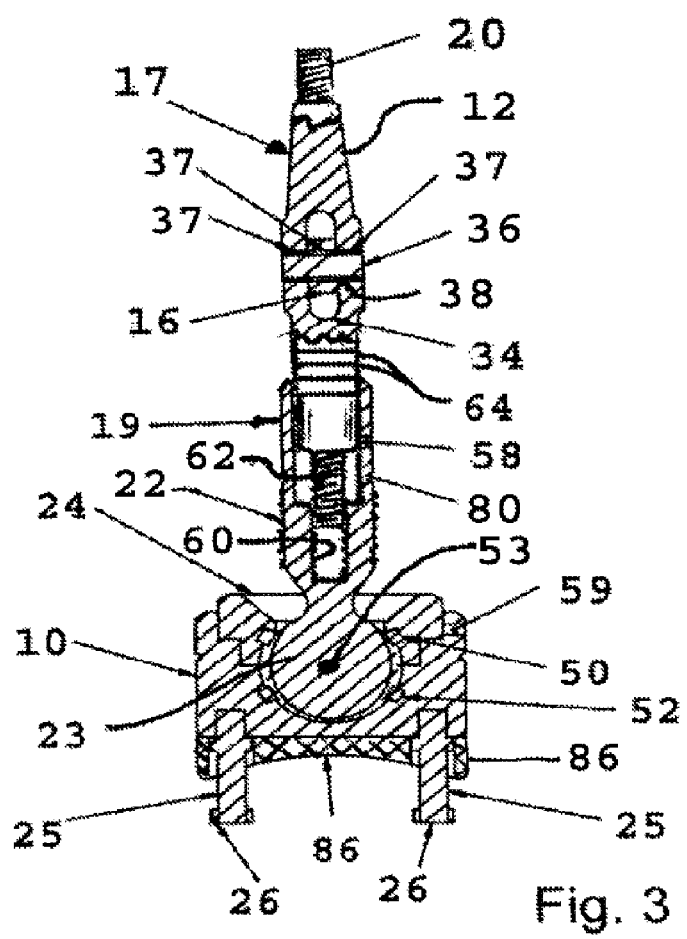
FIG. 3 is a transverse cross section taken through the centerline of the shift stick and base components shown in FIG. 1.

In accordance with the present invention the preferred pivot form for the shift stick is a ball joint. In the embodiment illustrated in the drawing and particularly FIGS. 2, 3 and 5, the ball formed at the lower extremity of the component 19 is held captive in the base 10 by, for example, two Ultra High Molecular Weight Polyethylene (UHMWPE), resilient compression washers 50 and 52. The upper compression washer 50 snaps into a corresponding annular slot formed on the knurled collar 24, and the lower compression washer 52 snaps into a corresponding annular slot formed within a generally spherical socket formed in the base 10. The lower washer 52 remains stationary relative to the base, while the upper washer 50 moves vertically with the collar 24 based on the relative position of the collar as it is threaded in and out of its threaded engagement with base 10.

Following assembly of the stick 12 and base 10, collar 24 is in a position circumscribing the ball-like end 23 of stick component 19 and the ball 23 being captured thereby when the collar is threaded onto the base thereby forming a ball joint at the lower end of stick 12 and defining a center of pivot or rotation at the geometrical center point 53 of the ball 23. As the collar is rotated clockwise, the external threads 54 of the collar interfacing with the internal threads 54 of the base 10 results in a tighter fit between the ball 23 and the two compression washers 50 and 52; a stiffer rotational relationship. Conversely, if the collar is rotated counter-clockwise, the fit between the washers and the ball 23 is loosened; a less stiff rotational relationship.

The adjustability designed into the shifter apparatus thus allows drivers to vary the stiffness or tension in the ball joint to their preferred, and then lock the setting using the base set screw 58. By tightening the set screw, there is no relative motion allowed between the base and the collar, thereby keeping the tension on the ball joint set at the user defined preference. To readjust the tension on the ball joint, the user simply needs to back out the set screw 58, rotate the knurled collar 24 either clockwise or counter-clockwise, and then re-tighten the set screw.

The relative distance between the hardened steel pin 36 and the ball joint center point 53 is directly proportional to the throw length of the shifter apparatus as a whole. By rotating the knurled stick component 19 in a clockwise direction, the relative distance between the pin 36 and the center point 53 increases due to the relationship between the internal threads 60 of the component 19 and the external threads 62 of the stick component 17. By increasing the relative distance between the pin 36 and the ball joint center point 53, the knob travel distance required to shift from one gear to another is decreased, or the throw length is decreased.

Four circumscribing grooves 64-70 providing visual indicators for throw length are formed on the mid portion of component 17 immediately below the slot 34, With the first groove 64 showing at the top end position of component 19 roughly equating to a stock car throw length, with the second groove 66 showing equating to a soft race throw length, with the third groove 68 showing equating to a hard race throw length, and with the fourth groove 70 showing equating to a rally shifter throw length. The capability of selectively adjusting the throw length within these parameters thus makes the throw length customizable to individual user's needs.

Once a desirable or an appropriate setting is selected by the driver, the throw length distance can be locked using the set screw 58 which tightens onto the outer face of component 17. To readjust the throw length, the user simply needs to back out the set screw 58, rotate the component 19 either clockwise or counter-clockwise to a new setting, and then re-tighten the set screw.

As the shift 12 is translated to its maximum range of motion, the chamfered throat 72 of the collar 24 and the taper 74 of the component 19 proximate the ball junction ball allow for extra clearance at the translation extremities. In most conventional applications, the transmission will positively shift before there is interference between these surfaces.

The annular groove 80 on the stick component 19 and annular groove 82 on the base 10 are attachment grooves for a leather boot (not shown). The purpose of such a boot would be to keep dust and debris out of the ball joint thereby keeping the mechanism clean, and smooth and easy to use. The leather boot is an optional attachment to the shifter apparatus.

A dampening base mount 86 made of a hard durometer rubber, or the like, is preferably sandwiched between the base 10 and the transmission hub or floor board of the vehicle. The base 10 has two laterally spaced steel studs 25 threaded into its bottom surface which extend through the mount 86, the transmission hub or floor board 27, and are tightened beneath the vehicle using lock nuts 26. As the lock nuts are tightened, the dampening base mount is squeezed between the floor or transmission hub of the car and the base. The base mount helps reduce transmission of road vibration to the base.

Although the above described invention has been disclosed above in terms of a single preferred embodiment, it is anticipated that alternative embodiments and modifications will become apparent to those skilled in the art. For example, the base 10 could be configured to have an upstanding ball shaped male pivot component, and the lower end of the lower stick component 19 could be configured to form a female socket including an appropriate clamping collar or the like for allowing adjustment of the frictional engagement (rotational stiffness) between the stick and the base. It is therefore intended that this description be considered exemplary and not limiting. It is further intended that the appended claims be interpreted broadly and as covering all such embodiments, alternatives and modifications as fall within the true spirit and scope of the invention.

The invention claimed is:

1. A remote shifter apparatus for use in a vehicle having a manual transmission including a shift lever, the shifter apparatus comprising:
   a base for attachment to the vehicle;
   an elongated shift stick including
      a first elongated shift stick component having a first extremity adapted to mate with a shifting knob, and a second extremity,
      a second elongated shift stick component having a third extremity, and a fourth extremity adapted to pivotally engage said base, and
      coupling means for adjustably connecting said third extremity to said second extremity and determining the overall length of said shift stick;
   pivot means pivotally coupling said fourth extremity of said second shift stick component to said base and including means for selectively controlling the stiffness of pivotal motion between said shift stick and said base;
   a fastener for engaging the shift lever of the vehicle transmission; and
   a linkage directly coupling a point along the length of said first shift stick component to the fastener to translate shift stick movement to the transmission shift lever, the distance between said point and said fourth extremity of said second shift stick component determining the effective throw-length of said shift stick,
   wherein adjustment of said coupling means allows the effective throw-length of said shift stick to be selected between a minimum limit and a maximum limit.

2. A remote shifter apparatus as recited in claim 1:
   wherein said coupling means includes an axial bore extending into one of said second or third extremities, said bore having internal threads formed along a predetermined portion of the length of said bore, and
   wherein the other of said second or third extremities has external threads formed along a predetermined portion of the length thereof and adapted to threadably engage the internal threads in said bore,
   whereby rotation of one of said components relative to the other causes a telescopic extension or retraction of the length of said shift stick and thus a change the effective throw-length of said shift stick.

3. A remote shifter apparatus as recited in claim 2:
   wherein said fourth extremity is configured to have a partially spherical shape; and
   wherein said means pivotally coupling said shift stick to said base includes means forming a generally hemispherical cavity adapted to nestingly receive and mate with said fourth extremity, and an annularly shaped collar adapted to surround, capture and retain said fourth extremity within said hemispherical cavity; and
   wherein said second component is rotatable about its longitudinal axis to cause the telescopic extension or retraction of the length of said shift stick thereby adjusting the throw-length of said shift stick.

4. A remote shifter apparatus as recited in claim 3:
   wherein said collar and said hemispherical cavity are matingly configured and threadably related to each other such that rotation of said collar relative to said cavity compressively affects the frictional relationship between said spherical shaped fourth extremity and said hemispherical cavity, and thereby affects the ease of movement of said stick relative to said base.

5. A remote shifter apparatus as recited in claim 4 and further including:
   at least one compression washer disposed within said cavity for frictional engagement with said spherical shaped fourth extremity.

6. A remote shifter apparatus as recited in claim 5 and further including:
   a second compression washer disposed between said collar and said spherical shaped fourth extremity.

7. A remote shifter apparatus as recited in claim 1 wherein said linkage includes:
   an elongated bar having one end secured to said shift stick by a pivot pin, and an opposite end secured to the transmission lever at its opposite end by another pivot pin, the pivot pins having longitudinal axes directed transverse to the lengths of said shift stick and said bar, and parallel to each other to facilitate accurate transfer of stick motion to transmission lever motion.

8. A retrofitable remote shifter for attachment to the actuating lever of a vehicle mounted transmission, comprising:
   a base for attachment to the chassis of a vehicle or to the housing of a transmission operatively mounted to the chassis and having an actuating lever, the attachment of the base to the chassis or to the housing being located at a position remote from the actuating lever of the transmission;
   an elongated, driver operated shift stick having one end thereof pivotally coupled to the base and rotatable in lateral and/or longitudinal directions relative to the drive axis of the transmission, said shift stick including
      a first elongated component having a first driver engagable extremity, and a second extremity;
      a second elongated component having a third extremity, and a fourth extremity adapted to pivotally engage said base; and
      shift stick length adjustment means coupling said third extremity to said second extremity in a manner allowing the length of a part of said shift stick, between an intermediate point along the length of said first component and said one end of said shift stick, to be selectively adjusted between a minimum limit and a maximum limit; and a linkage coupling said intermediate point to the transmission actuating lever and operative to transfer shift stick motion to the actuating lever to effect shifting of the transmission, wherein the adjustment of the shift stick length changes the effective throw-length of said shift stick.

9. A retrofitable remote shifter as recited in claim 8 wherein said second extremity of said first component, and said third extremity of said second component are telescopically related and threadably coupled together so as to allow the length of said shift stick to be selectively adjusted between said minimum limit and said maximum limit in response to rotation of one of said first and second components about its longitudinal axis.

10. A retrofitable remote shifter as recited in claim 9:

wherein said fourth extremity is configured to have a partially spherical shape; and wherein the pivotal coupling of said shift stick to said base includes means forming a generally hemispherical cavity adapted to nestingly receive and mate with said fourth extremity, and an annularly shaped collar adapted to surround, capture and retain said fourth extremity within said hemispherical cavity.

11. A remote shifter apparatus as recited in claim 10:

wherein said collar and said base are matingly configured and threadably related to each other such that rotation of said collar relative to said base tends to compressively affects the frictional relationship between said spherical shaped fourth extremity and said base, and thereby affects the ease of pivot of said stick relative to said base.

12. A remote shifter apparatus as recited in claim 11 and further including:

at least one compression washer disposed within said cavity for frictional engagement with said spherical shaped fourth extremity.

13. A remote shifter apparatus as recited in claim 10 and further including:

a second compression washer disposed between said collar and said spherical shaped fourth extremity.

14. A retrofitable remote shifter as recited in claim 8 wherein the pivotal coupling of said stick to said base is accomplished by means of ball and socket components.

15. A retrofitable remote shifter as recited in claim 14 wherein said pivotable coupling includes means for adjusting the frictional engagement relationship of the ball and socket components to control the rotational stiffness of the pivotable coupling.

16. A remote shifter apparatus as recited in claim 8 wherein said linkage includes:

an elongated bar pivotably secured to said shift stick at one end and the transmission lever at the opposite end by pivot pins having longitudinal axes directed parallel to each other to facilitate accurate transfer of shift stick motion to transmission lever motion.

* * * * *